G. A. JOHNSON.
COUPLING DEVICE FOR ELECTRIC WIRE CONDUITS, &c.
APPLICATION FILED APR. 25, 1918.
1,275,439.
Patented Aug. 13, 1918.
2 SHEETS—SHEET 1.
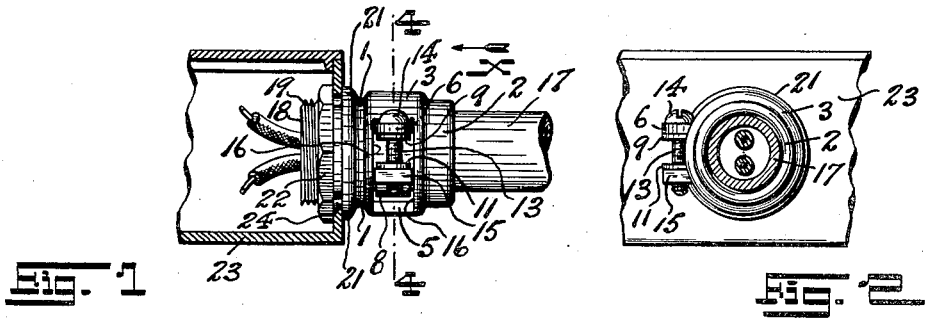
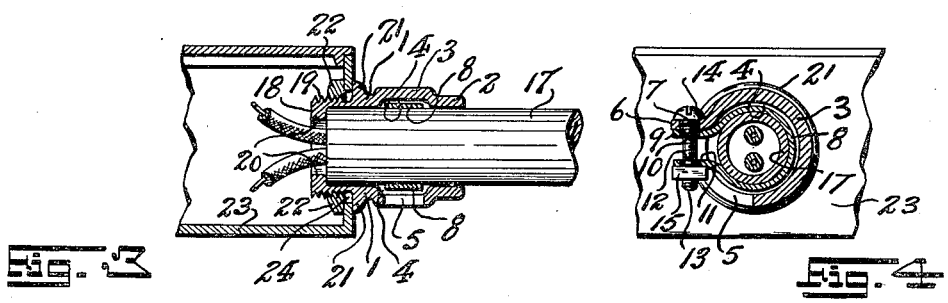
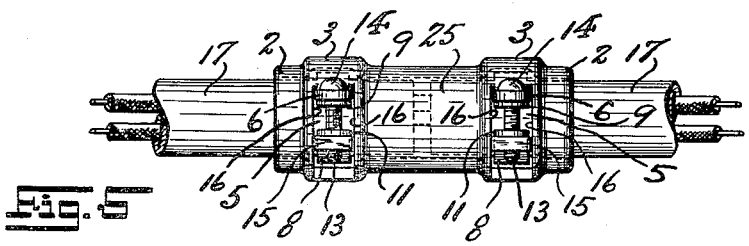
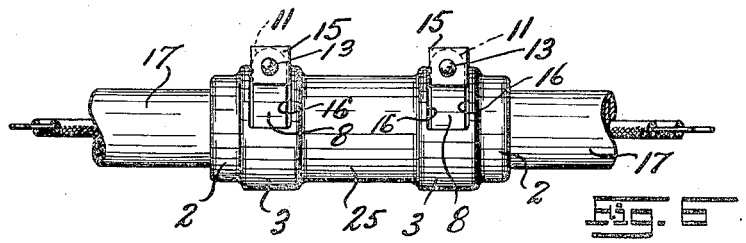
WITNESSES:
Eva E. Desch.
Fredk. H. W. Frantzel
INVENTOR
Gustave A. Johnson,
BY
Frantzel and Richards
ATTORNEYS

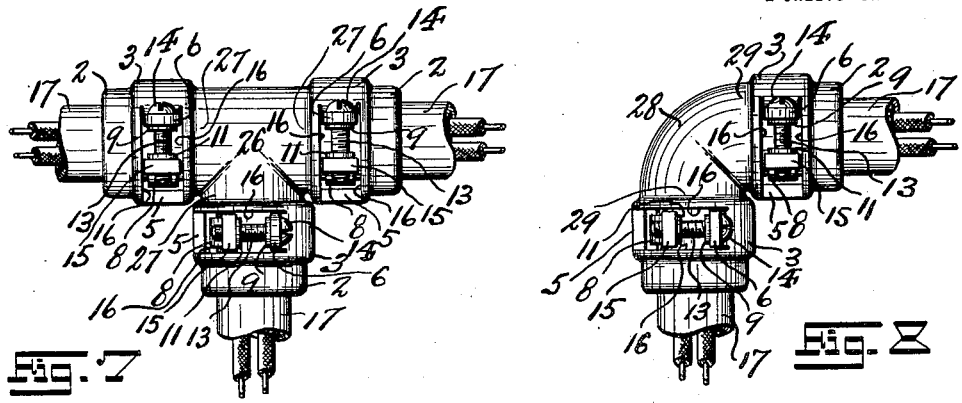
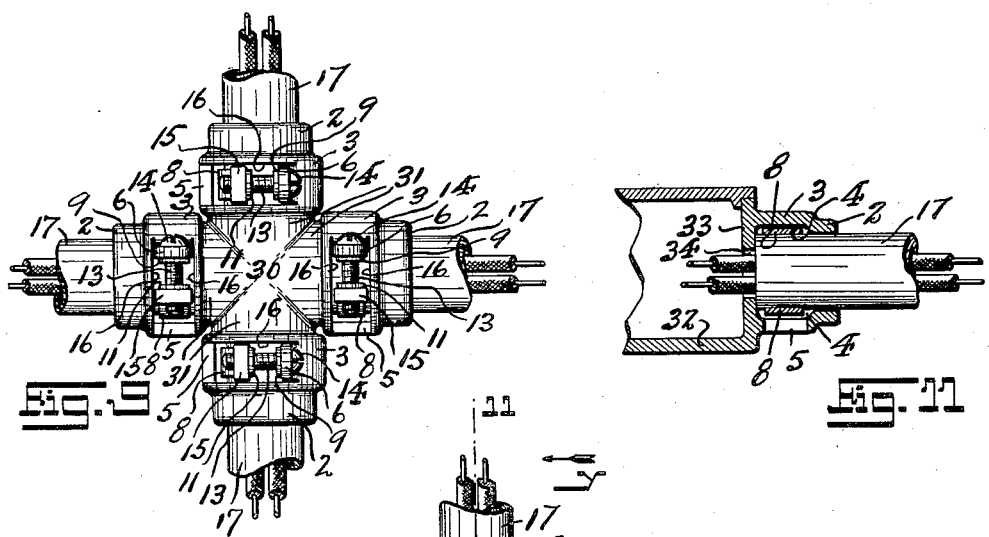
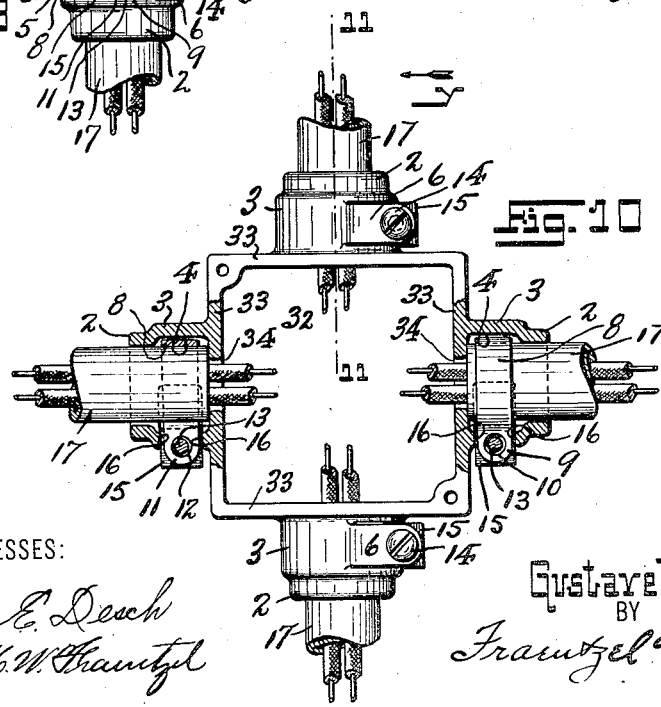

UNITED STATES PATENT OFFICE.

GUSTAVE A. JOHNSON, OF IRVINGTON, NEW JERSEY.

COUPLING DEVICE FOR ELECTRIC-WIRE CONDUITS, &c.

1,275,439.      Specification of Letters Patent.      Patented Aug. 13, 1918.

Application filed April 25, 1918. Serial No. 230,688.

*To all whom it may concern:*

Be it known that I, GUSTAVE A. JOHNSON, a citizen of the United States, residing at Irvington, in the county of Essex and State of New Jersey, have invented certain new and useful Improvements in Coupling Devices for Electric-Wire Conduits, &c.; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in coupling or connecting devices for use in connection with electric wire conduits, armored electric cables, and the like; and the invention relates, more particularly, to an improved construction of coupling or connecting devices having strong gripping or clamping means for holding firmly and immovably, in coupled relation with each other, or with an outlet box or other stationary device, lengths of electric wire conduits, armored electric cable and similar conduits or pipes.

The invention has for its principal object to provide a simple, cheap, strong, durable, and easily and quickly manipulated coupling or connecting device for the purposes above mentioned, which is provided with a quickly and easily adjusted gripping or clamping means for engaging the ends of electric wire conduit or armored cable, and thereby firmly joining sections or lengths of the latter together in desired arrangement, or firmly joining the same in connection with an outlet box, or other stationary device.

Other objects of the present invention, not at this time more particularly enumerated, will be clearly understood from the following detailed description of the said invention.

With the various objects of my invention in view, the same consists, primarily, in the novel construction of coupling or connecting device for electric wire conduits, armored electric cable, and the like, hereinafter set forth; and the invention consists, furthermore, in the several novel arrangements and combinations of the various devices and parts, as well as in the details of the construction of said parts, all of which will be hereinafter more fully described and claimed.

The invention is clearly illustrated in the accompanying drawings, in which:—

Figure 1 is a side elevation of my novel construction of coupling or connecting device illustrated in its operative relation to an outlet box and to the end of an electric wire conduit, said outlet box being shown in section; Fig. 2 is an outer end elevation of the same, the electric wire conduit being shown in section; Fig. 3 is a vertical longitudinal section of the same; and Fig. 4 is a transverse section of the same, taken on line 4—4 in said Fig. 1, looking in the direction of the arrow $x$.

Fig. 5 is a side elevation of my novel construction of coupling or connecting device as arranged to serve as a union or a means for coupling together sections of electric wire conduit or armored cable; and Fig. 6 is a bottom side elevation of the same.

Fig. 7 is a side elevation of my novel construction of coupling or connecting device as arranged to serve as a T connector; Fig. 8 illustrates the same as arranged to serve as an elbow connector; and Fig. 9 illustrates the same as arranged to serve as a double T connector.

Fig. 10 is a part top view and part section of an outlet box having integrally formed therewith coupling or connecting devices made according to and embodying the principles of my present invention; and Fig. 11 is a detail longitudinal section through the same taken on line 11—11 in said Fig. 10, looking in the direction of the arrow $y$.

Similar characters of reference are employed in all of the hereinabove described views to indicate corresponding parts.

Referring now to the said drawings, the reference character 1 indicates a tubular body portion provided adjacent to its open outer end 2 with an annular enlarged portion 3 providing an interior annular recess or chamber 4 within said tubular body-portion 1. The wall of said annular enlarged portion 3 is cutaway throughout a portion of its circumference to provide an opening 5. Connected with the wall of said annular enlarged portion 3, at the upper end of said opening 5, is an integrally formed outwardly extending tongue or lug 6 provided with a perforation 7. Seated within said annular recess 4 is a circular clamp strap or band 8. The upper end 9 of said strap or band 8 extends outwardly through said opening 5 so as to register beneath said tongue or lug 6, said upper end 9 having a perforation 10 registering with the perforation 7 of said tongue or lug 6. The lower end 11 of said strap or band 8 also extends outwardly through said opening 5 so as to be positioned beneath said upper end 9 thereof, and slightly spaced away from the latter, said lower end 11 also having a perforation 12 alined with the perforations 7 and 10. Extending downwardly through the alined perforations 7, 10 and 12, is the shank 13 of a clamp-screw, the head 14 of which is normally engaged against the upper surface of said tongue or lug 6. Screwed upon the free end of said clamp screw shank 13 is a nut 15, the same being positioned so as to engage the underside of said lower end 11 of said strap or band 8. Said nut 15 is of such a size that it may ride freely between the side marginal edges 16 of said opening 5, said edges 16 engaging the same so as to prevent any rotation of the nut when the clamp-screw is turned, but freely permitting the nut to move vertically upon the shank 13 of said clamp-screw.

The reference character 17 indicates a metallic tubular electric wire conduit. In engaging said conduit with the coupling or connecting device, an end of the same is inserted into the open end 2 of the tubular body portion 1, so that the same passes through the circular clamp strap or band 8, then, by turning or tightening up the clamp-screw, the nut 15 is caused to travel upwardly upon the screw shank 13, thus moving the lower end 11 of the clamp-strap or band 8 toward the upper end 9 of the latter, thus constricting said strap or band 8 about the end of said conduit in firmly clamped or bound embracing relation thereto, and consequently securely and firmly anchoring the end of said conduit in connected relation to said coupling or connecting device. Of course, it will be understood that armored electric cable may be engaged with the coupling or connecting device in exactly the same manner.

When the novel coupling or connecting device is designed for use in connection with outlet boxes or similar stationary devices, the end 18 opposite its open end 2 is provided with exterior screw threads 19. Said end 18 is open but is provided with an inwardly extending annular stop-flange or shoulder 20, against which the end of said conduit 17 is stopped, when the same is thrust within the body-portion 1. Said inner end 18 is further provided with an exteriorly extending annular stop-shoulder or flange 21 located back of the inner end of said screw thread 19. The reference character 22 indicates a fastening nut adapted to screw upon said screw-thread 19 of said inner end 18.

In Figs. 1 to 4 inclusive of the drawings, the reference character 23 indicates the body of an outlet box or similar device, the same being provided in its walls with the usual openings 24 adapted to give access to the interior thereof. The inner end 18 of the coupling device is passed through an opening 24 in the outlet box 23 until stopped by the engagement of the stop-shoulder or flange 21 with the outer side of said outlet box wall. The nut 22 is then screwed upon the screw-thread 19 until the same engages the inner side of the outlet box wall, thus firmly securing the coupling or connecting device in operative or connected relation to said outlet box.

As shown in Figs. 5 and 6 of the drawings my novel coupling or connecting devices are arranged to form a part of a union device 25 whereby two sections or lengths of conduit 17 may be coupled together end to end. In Fig. 7 of the drawings I have shown a T-fitting 26, the respective arms 27 of which are provided with my novel coupling or connecting device. In Fig. 8 of the drawings I have shown an elbow fitting 28 the arms 29 of which are constructed to form my novel coupling or connecting devices. And in Fig. 9 I have shown a double T-fitting 30 the arms 31 of which are constructed to form my novel coupling or connecting devices. In all of these last mentioned constructions it will be apparent that the principles and construction of my novel coupling or connecting device have been so applied to various shapes of fittings, that electric wire conduits or electric armored cable, may be joined together in practically any desired arrangement.

Referring now to Figs. 10 and 11 of the accompanying drawings, I have illustrated therein an outlet box 32 to the side walls 33 of which are integrally connected, as a permanent part of the box, the novel coupling devices embodying my invention, said side walls 33 of the box having openings 34 alined with the interior of said coupling devices, so that the wires emerging from the conduits 17 may be led therethrough into the interior of the box.

I am aware that some changes may be made in the various arrangements and combinations of the several devices and parts, as well as in the details of the construction of the same, without departing from the scope of my invention as above described, and as defined in the appended claims. Hence, I do not limit my invention to the exact arrangements and combinations of the various devices and parts as described in the foregoing specification, nor do I confine myself to

I claim:—

1. In a device of the kind described, a longitudinally open body-portion having an open circular free end, an annularly enlarged portion adjacent to said open end and providing an interiorly disposed annular recess, a part of the wall of said annularly enlarged portion being cut away to provide an opening therethrough communicating with said recess, an outwardly extending perforated lug at one end of said opening, a contractible strap seated in said annular recess so as to leave the bore of said body-portion normally unobstructed, said strap having alined ends projecting outwardly through said opening, and means supported by said perforated lug and engaging said strap ends for contracting said strap.

2. In a device of the kind described, a body-portion having an open end, an annular enlarged portion adjacent to said open end and providing an interiorly disposed annular recess, a part of the wall of said annularly enlarged portion being cutaway to provide an opening therethrough communicating with said recess, an outwardly extending perforate lug at one end of said opening, a contractible strap seated in said recess, said strap having alined perforated ends normally spaced apart and projecting exteriorly through said opening beneath said lug, a clamp-screw, the shank of said clamp-screw passing through the perforations of said lug and said strap ends, the head of said clamp-screw bearing upon the upper surface of said lug, and a nut on said clamp-screw beneath said strap ends, said nut being embraced by the side edges of said opening so as to be maintained against turning whereby the turning of said clamp-screw will cause said nut to rise on said clamp-screw to draw together the strap ends between said lug and said nut and thereby contract said strap.

3. In a device of the kind described, a body-portion having an open end, an annularly enlarged portion adjacent to said open end and providing an interiorly disposed annular recess, a part of the wall of said annularly enlarged portion being cutaway to provide an opening therethrough communicating with said recess, an outwardly extending perforate lug at one end of said opening, a contractible strap seated in said recess, said strap having alined perforated ends normally spaced apart and projecting exteriorly through said opening beneath said lug, a clamp-screw, the shank of said clamp-screw passing through the perforations of said lug and said strap ends, the head of said clamp-screw bearing upon the upper surface of said lug, and a nut on said clamp screw beneath said strap ends, said nut being embraced by the side edges of said opening so as to be maintained against turning whereby the turning of said clamp-screw will cause said nut to rise on said clamp-screw to draw together the strap ends between said lug and said nut and thereby contract said strap, said body portion being engaged at its opposite end with the walls of an outlet box so as to communicate with the interior of the latter.

4. In a device of the kind described, a body-portion having an open end, an annularly enlarged portion adjacent to said open end and providing an interiorly disposed annular recess, a part of the wall of said annularly enlarged portion being cutaway to provide an opening therethrough communicating with said recess, an outwardly extending perforate lug at one end of said opening, a contractible strap seated in said recess, said strap having alined perforated ends normally spaced apart and projecting exteriorly through said opening beneath said lug, a clamp-screw, the shank of said clamp-screw passing through the perforations of said lug and said strap ends, the head of said clamp-screw bearing upon the upper surface of said lug, and a nut on said clamp-screw beneath said strap ends, said nut being embraced by the side edges of said opening so as to be maintained against turning whereby the turning of said clamp-screw will cause said nut to rise on said clamp-screw to draw together the strap ends between said lug and said nut and thereby contract said strap, an exteriorly threaded portion at the opposite end of said body-portion, an annular exterior stop-shoulder in the rear of said threaded portion, and a nut adapted to screw upon said threaded portion.

In testimony, that I claim the invention set forth above I have hereunto set my hand this 23rd day of April, 1918.

GUSTAVE A. JOHNSON.

Witnesses:
GEORGE D. RICHARDS,
FRED'K C. FRAENTZEL.